United States Patent
Viswanath

(10) Patent No.: US 6,757,742 B1
(45) Date of Patent: Jun. 29, 2004

(54) COMPUTER-BASED SYSTEM FOR VALIDATING HASH-BASED TABLE LOOKUP SCHEMES IN A NETWORK SWITCH

(75) Inventor: Somnath Viswanath, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/577,491

(22) Filed: May 25, 2000

(51) Int. Cl.[7] .............................................. G06F 15/16
(52) U.S. Cl. ........................ 709/246; 709/213; 709/245; 370/389
(58) Field of Search ................................ 709/102, 220, 709/213, 245, 246; 370/255, 466, 469, 423, 229, 389, 422

(56) References Cited

U.S. PATENT DOCUMENTS

| | | | | |
|---|---|---|---|---|
| 5,130,977 A | * | 7/1992 | May et al. | 370/422 |
| 5,768,515 A | * | 6/1998 | Choquier et al. | 709/206 |
| 5,953,335 A | | 9/1999 | Erimli et al. | |
| 6,295,299 B1 | * | 9/2001 | Haddock et al. | 370/423 |
| 6,320,848 B1 | * | 11/2001 | Edwards et al. | 370/255 |
| 6,338,078 B1 | * | 1/2002 | Chang et al. | 709/102 |
| 6,438,674 B1 | * | 8/2002 | Perloff | 711/216 |
| 6,473,400 B1 | * | 10/2002 | Manning | 370/229 |
| 6,504,843 B1 | * | 1/2003 | Cremin et al. | 370/389 |
| 6,594,261 B1 | * | 7/2003 | Boura et al. | 370/389 |
| 6,690,667 B1 | * | 2/2004 | Warren | 370/389 |
| 2001/0043614 A1 | * | 11/2001 | Viswanadham et al. | 370/469 |
| 2002/0163935 A1 | * | 11/2002 | Paatela et al. | 370/466 |
| 2003/0043825 A1 | * | 3/2003 | Magnussen et al. | 370/401 |

FOREIGN PATENT DOCUMENTS

WO    WO 9638955    * 12/1996

OTHER PUBLICATIONS

Fox, Edward A. et al, "Practical minimal perfect hash functions for large database." Communication of the ACM, v35, n1, p. 105 (17), Jan. 1992.*

* cited by examiner

Primary Examiner—Hosain Alam
Assistant Examiner—Oanh Duong
(74) Attorney, Agent, or Firm—Manelli Denison & Selter PLLC; Leon R. Turkevich

(57) ABSTRACT

A computer-based system is configured for generating a first data structure having entries representing respective network nodes having layer 2 and layer 3 network addresses. The system generates a second data structure, having a plurality of data packet headers, by selecting source and destination pairs from the first data structure and combining the respective layer 2 and layer 3 network addresses from the respective selected source and destination pairs with randomly-generated numbers representing layer 3 payload data. The second data structure is supplied to a switch model configured for parsing the layer 3 network addresses according to selected hash functions. Hence, the computer-based system is able to evaluate the selected hash functions based on a time-independent analysis, eliminating the necessity of building an actual network in hardware or simulating network traffic over a period of time.

28 Claims, 3 Drawing Sheets

COMPUTER-BASED SYSTEM FOR VALIDATING HASH-BASED TABLE LOOKUP SCHEMES IN A NETWORK SWITCH

BACKGROUND OF THE INVENTION

1. Field of the Invention

The present invention relates to testing and validation of hashing schemes used in a network switch.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a nonblocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the nonblocking features of the network switch, as it becomes increasingly difficult for the switching fabric of a network switch to be able to perform layer 3 processing at the wire rates (i.e., the network data rate). For example, switching fabrics in layer 2 switches require only a single hash key to be generated from a MAC source address and/or a MAC destination address of an incoming data packet to determine a destination output port; the single hash key can be used to search an address lookup table to identify the output port. Layer 3 processing, however, requires implementation of user-defined policies that include searching a large number of fields for specific values. These user-defined policies may specify what type of data traffic may be given priority accesses at prescribed intervals; for example, one user defined policy may limit Internet browsing by employees during work hours, and another user-defined policy may assign a high priority to e-mail messages from corporate executives. Hence, the number of such user policies may be very large, posing a substantial burden on performance of layer 3 processing at the wire rates.

In addition, network designers need to be able to test alternative hash based table lookup schemes. However, these hash based table lookup schemes cannot be algorithmically evaluated. Hence, simulation has been used to capture statistics, where a simulator generates data packets and sends the data packets to the network switch or a Verilag based representation (i.e., model) of the network switch. Unfortunately, such simulation techniques have limited utility in evaluating hash based table lookup schemes. In particular, the validation of the effectiveness of a hash based table lookup requires the generation of a substantial amount of data; if this data was to correspond to packets on a computer network, the time required for the simulator to generate the simulated packets would be enormous. In addition, it is often difficult to evaluate the effectiveness of the hashing function within the network switch, since performance issues may be caused by other system components.

SUMMARY OF THE INVENTION

There is a need for an arrangement that enables the evaluation of the effectiveness of a hash based table lookup scheme in an efficient manner.

There is also a need for an arrangement that enables multiple hash based lookup schemes to be evaluated in an efficient manner to determine the optimum hash based table lookup scheme for a network.

These and other needs are attained by the present invention, where a computer-based system is configured for generating a first data structure having entries representing respective network nodes having layer 2 and layer 3 network addresses. The system generates a second data structure, having a plurality of data packet headers, by selecting source and destination pairs from the first data structure and combining the respective layer 2 and layer 3 network addresses from the respective selected source and destination pairs with randomly-generated numbers representing layer 3 payload data. The second data structure is supplied to a switch model configured for parsing the layer 3 network addresses according to selected hash functions. Hence, the computer-based system is able to evaluate the selected hash functions based on a time-independent analysis, eliminating the necessity of building an actual network in hardware or simulating network traffic over a period of time.

One aspect of the present invention provides a method in a computer system. The method includes generating and storing on a tangible medium a first data structure having entries, each entry representing a network node and having a corresponding layer 2 and layer 3 network address. The method also includes generating a second data structure having a plurality of data packet headers, by selecting source and destination pairs from the first data structure, and combining the layer 2 and layer 3 network addresses of the selected source and destination pairs with respective randomly-generated numbers representing layer 3 payload data to form the data packet headers, and evaluating a hash function by supplying the second data structure to a switch model configured for parsing at least a portion of the data packet headers according to the hash function, and monitoring results of the parsing by the hash function. Generation of the first data structure having entries representing network nodes with layer 2 and layer 3 network addresses enables use of a data representation for analyzing network behavior, as opposed to the necessity of generating actual data packets using an implemented local area network or a simulator. Moreover, generation of the second data structure having the data packet headers enables optimized computer-based evaluation of the hash function by the switch model, since the switch model has immediate access to all data packet headers, minimizing processing time during the evaluation procedure.

Another aspect of the present invention provides a computer-based system comprising a controller, a switch model, and an evaluation module. The controller is configured for generating and storing on a tangible medium a first data structure having entries, each entry representing a network node and having a corresponding layer 2 and layer 3 network address. The controller is also configured for generating a second data structure having a plurality of data packet headers, by selecting source and destination pairs from the first data structure, and combining the layer 2 and layer 3 network addresses of the selected source and destination pairs with respective randomly-generated numbers representing layer 3 payload data to form the data packet headers. The switch model is configured for parsing at least a portion of the data packet headers according to at least one hash function, and the evaluation module is configured for evaluating the at least one hash function by supplying the second data structure to the switch model and monitoring results of the parsing by the hash function.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to an arrangement for testing efficiency of hash functions, used by layer 2 and layer 3 switches for address lookup operations. An illustration of a hash-based search will be briefly described below, followed by a description of the arrangement for evaluating hash functions according to an embodiment of present invention.

Figure 1:
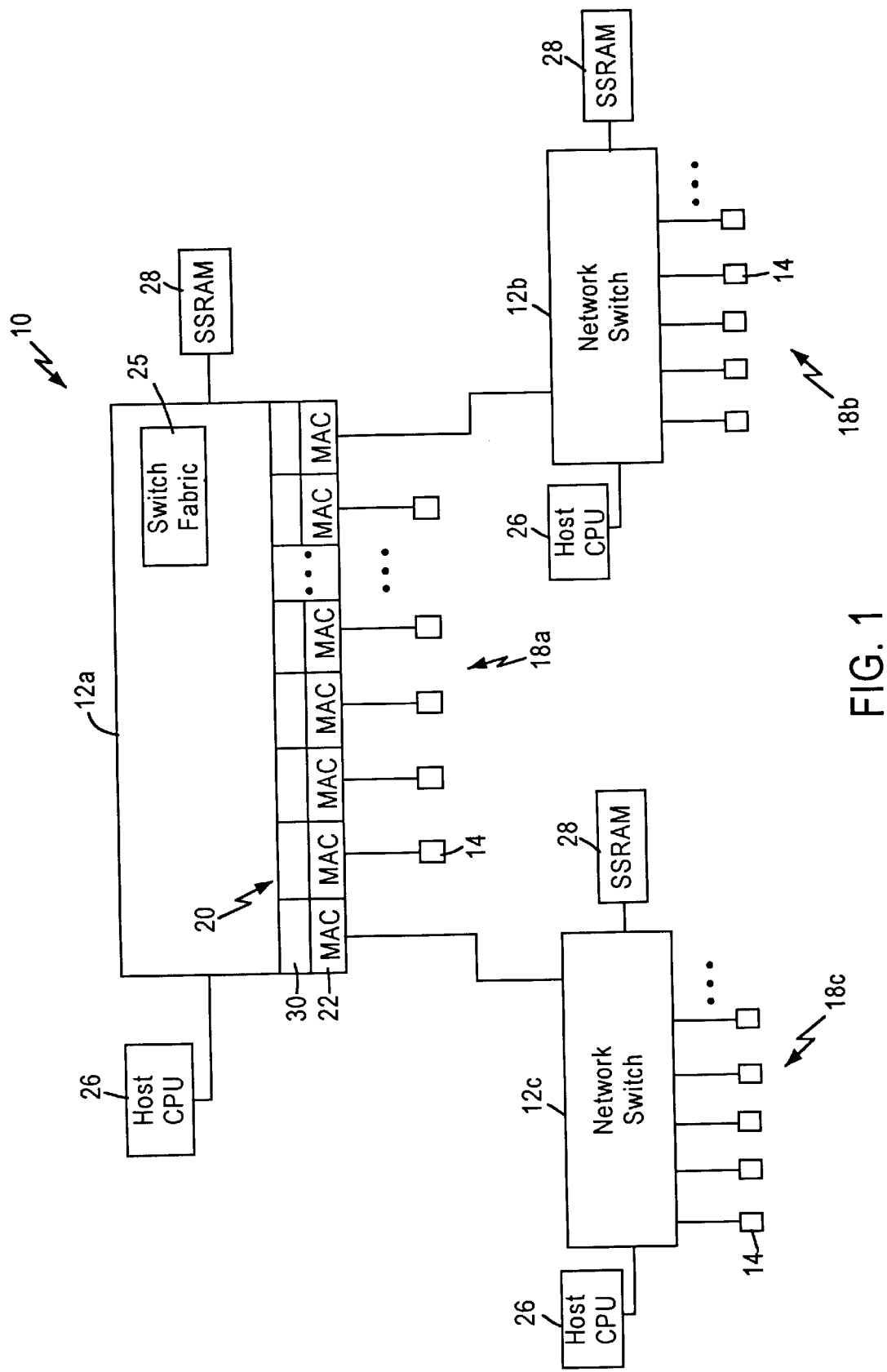
FIG. 1 is a block diagram illustrating a packet switched network including multiple network switches for switching data packets between respective subnetworks.

FIG. 1 discloses a packet switched network 10 having multiple network switches 12 serving network nodes 14 of respective subnetworks 18. Each network switch 12 has network switch ports 20, where each network switch port 20 includes a packet classifier module 30 configured for identifying data flows and a media access controller (MAC) 22 configured for transferring data packets according to Ethernet (IEEE 802.3) protocol. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c.

The packet classifier module 30 may identify a data flow by generating hash-based packet signatures for a data packet based on hash action values specified within a user-programmable template. In other words, the packet classifier module 30 may store a plurality of hash-based packet signatures based on selected parameters within the header of a data frame, such as layer 2 (MAC) source and/or destination address, layer 3 (IP) source and/or destination address, layer 4 header information such as TCP or UDP source and/or destination port numbers, or protocol number.

In addition, each network switch 12 includes a switch fabric 25 configured for generating frame forwarding decisions, for example layer 2 frame forwarding decisions based on the MAC addresses, and/or layer 3 frame forwarding decisions based on the IP addresses. Hence, the switch fabric 25 may also use a hash-based address lookup scheme to locate frame forwarding information for a received data frame.

As shown in FIG. 1, each switch 12 has an associated host CPU 26 and a buffer memory 28, for example an SSRAM. The host CPU 26 controls the overall operations of the corresponding switch 12, including programming of the switch fabric 25 or the packet classifier model 30 with the appropriate hash values according to a selected hash function. The buffer memory 28 is used by the corresponding switch 12 to store data frames while the switch fabric 25 is processing forwarding decisions for the received data packets.

As described above, users of the host CPU 26 may use different types of hash functions (i.e., hash functions having different hash polynomials) during implementation of the network switches 12 within a network. However, the effectiveness of different hash functions having different hash polynomials cannot be algorithmically determined. Hence, network designers have had to previously use a simulator to artificially generate data packets over a period of time to determine the performance characteristics of the hash functions relative to the assigned network addresses. As described above, however, such an approach requires substantially a long time.

According to the disclosed embodiment, multiple data packet headers are generated and stored in a data structure by a computer system for evaluation using a switch model representing the hash function operations. The data structure having the multiple data packet headers is then supplied to the switch model for parsing of the data packet headers according to the prescribed hash function (i.e., based on the corresponding hash polynomial coefficients). The computer system includes an evaluation module that monitors the hash function operations, and determines the hash table efficiency based on the prescribed hash function. Hence, the computer-based analysis enables the equivalent of one million packets to be generated and parsed by the switch model in less than 20 seconds.

Figure 2:
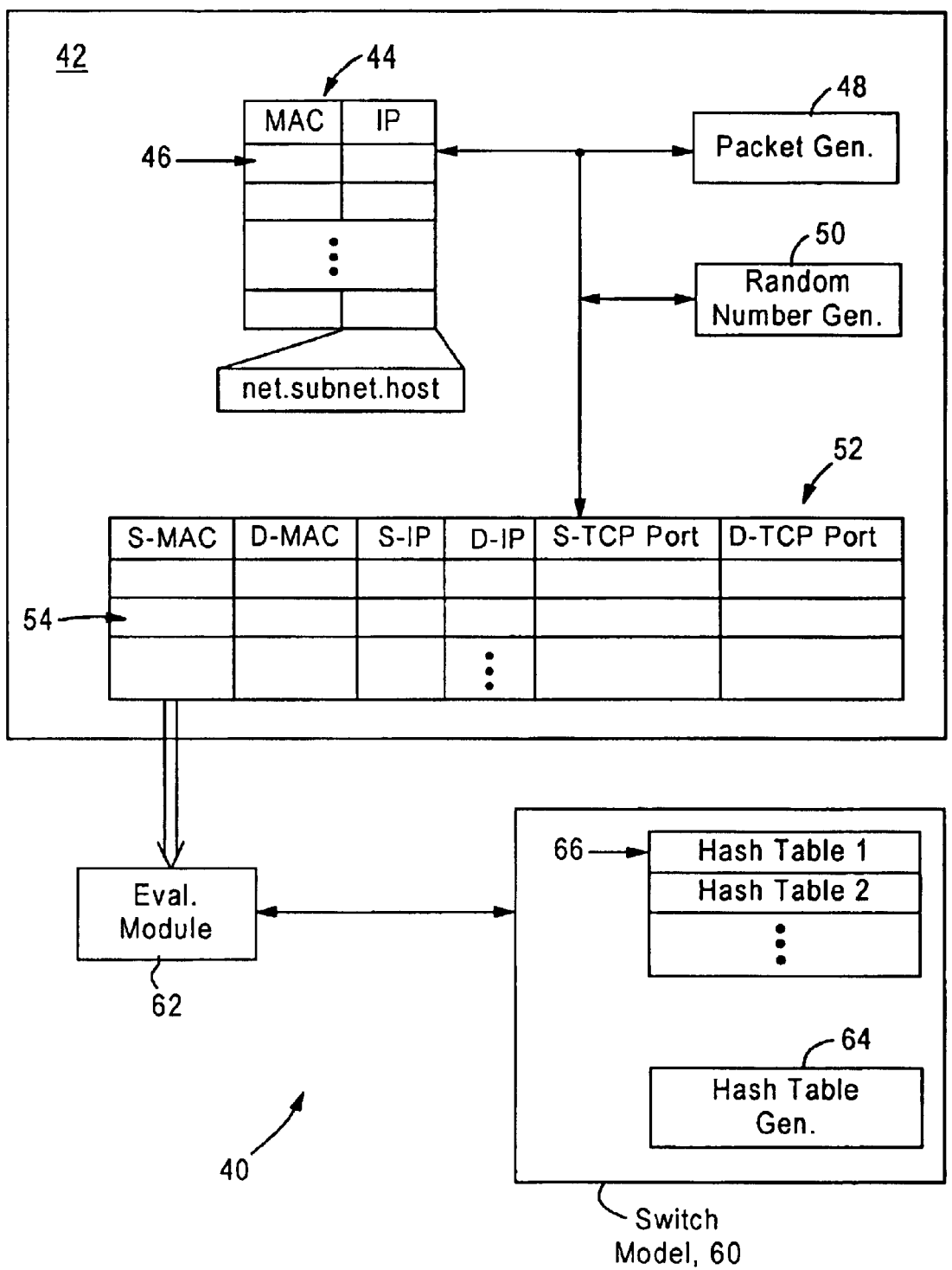
FIG. 2 is a block diagram illustrating in detail a computer system used to evaluate hash functions for network addresses of the packet switched network of FIG. 1 according to an embodiment of the present invention.

FIG. 2 is a diagram illustrating a computer-based system for evaluating hash tables generated based on a prescribed hash functions according to an embodiment of the present invention. The system 40 includes a controller system 42 configured for generating and storing on a tangible medium (e.g., a hard disk drive, a floppy drive, a random access memory, an EPROM, a compact disc, etc.) a data structure 44, illustrated as an address table having multiple address entries 46. Each entry 46 represents a network node (e.g., a network workstation 14 or a network switch port 20) and has a corresponding unique layer 2 MAC address and a unique layer 3 IP address. In particular, a user may program the address table 44 with MAC and IP addresses that are to be used in deployment of the network 10. For example, a user may program the address table 44 such that all the IP addresses have the same network identifier, and where the IP addresses are grouped according to a prescribed subnetwork identifiers. Hence, the address table 44 can be used as a model of the network 10.

The controller system 42 also includes a packet generator 48 and a random number generator 50. The packet generator 48 is configured for generating a second data structure, for example a data packet header table 52, used to simulate network data traffic generated by the network nodes represented by the address table 44. In particular, the packet generator 48 is configured for randomly selecting source and destination address pairs from the address table 44, and adding two 16-bit fields generated by the random number generator 50 and representing TCP source port and TCP destination port, resulting in a "virtual packet". The "virtual packet" is stored into the data packet header table 52 in the form of a data packet header 54 having a source MAC address, a destination MAC address, a source IP address, a destination IP address, a TCP source port and a TCP destination port.

As shown in FIG. 2, the system 40 also includes a switch model 60 and an evaluation module 62. The switch model 60 includes a hash table generator 64 configured for generating a plurality of hash tables 66, wherein each hash table 66 is configured for storing hash keys generated based on a corresponding hash function having a unique set of hash polynomials. Hence, the evaluation module 62 evaluates the hash polynomials by supplying the data packet header table 52 to the switch model 60, and monitoring the parsing (i.e., hashing) of selected fields of the data packet headers 54 according to the respective hash functions. Hence, the evaluation module 62 can determine which of the hash tables 66 has an optimum performance characteristic relative to the population of network addresses supplied by the data packet header table 52. Moreover, the evaluation module 62 supplies all the data packet headers 54 in the data packet header table 52 simultaneously, providing a time-independent analysis of the hashing operations.

Figure 3:
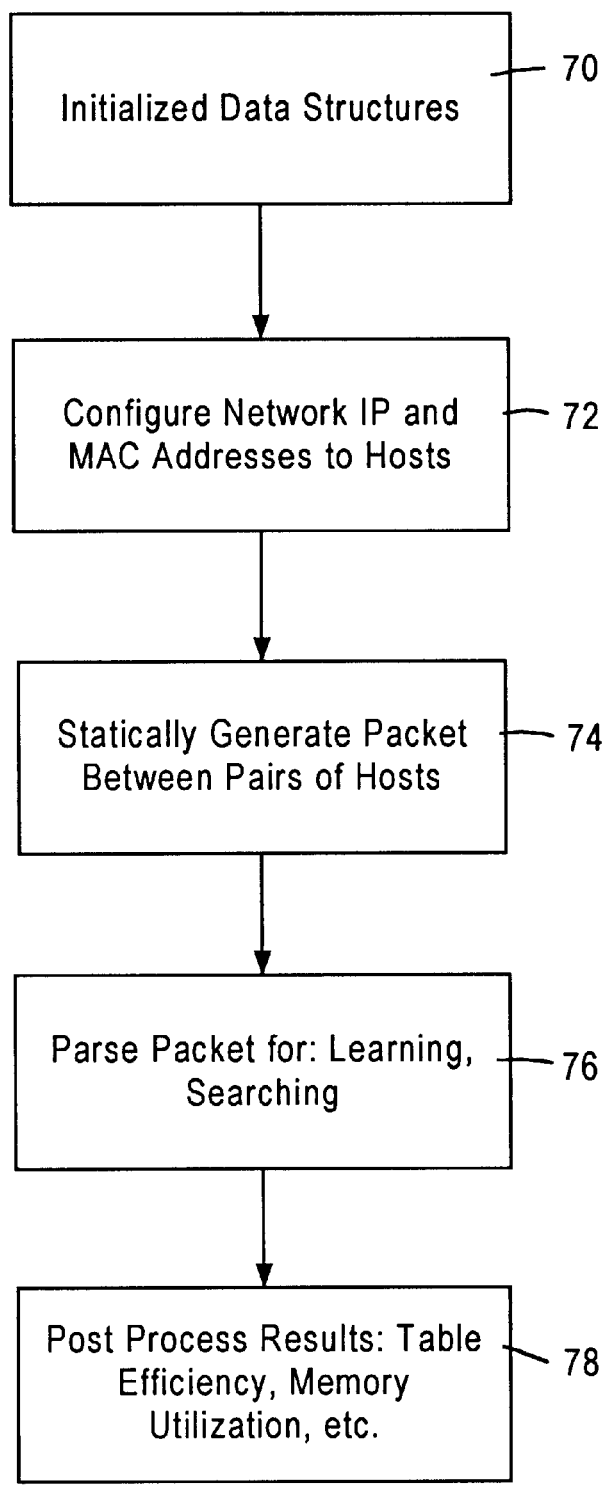
FIG. 3 is a flow diagram illustrating the method of evaluating a hash function according to an embodiment of the present invention.

FIG. 3 is a flow diagram illustrating the method of evaluating hash functions according to an embodiment of the present invention. The steps described in FIG. 3 can be implemented as executable code (e.g., written in C) stored on a computer readable medium (e.g., a hard disk drive, a floppy drive, a random access memory, a read only memory, an EPROM, a compact disc, etc.). The method begins in step 70, where the data structure 44 is initialized (i.e., defined) and stored on a tangible medium. The controller 42 then configures the simulated network in step 72 by populating the address table 44 with unique MAC address-IP address pairs as entries 46. As described above, the IP addresses may be arranged based on prescribed network and subnetwork identifier values.

The controller 42 then statically (i.e., independent of time) generates virtual packets in step 74 by randomly selecting source and destination host pairs from the address table 44, and appending two 16-bit fields representing TCP source port and TCP destination port having random values generated by the random number generator 50. The controller 42 then stores the virtual packets in the data packet header table 52.

The evaluation module 62 then forwards the data packet header table 52 to the switch model 60, causing the hash table generator 64 to parse each of the virtual packets represented by the respective data packet headers 54 according to the respective hash functions in step 76. The evaluation module 62 monitors the hashing operations of the hash table generator 64 in populating the hash tables 66 according to the respective hash functions, and outputs performance results in step 78. For example, the evaluation module 62 may specify table efficiency, memory utilization, and the like, enabling a user to select a hash function that is optimized for the network addresses in the data packet header table 52.

According to the disclosed embodiment, hash polynomials can be evaluated to determine the effectiveness of a hash based table lookup, without the necessity of using a simulator that outputs simulated data packets over time. Rather, a data structure having simulated packets is generated and supply to a switch model, enabling efficient evaluation of hash based table lookup operations.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a computer system, the method comprising:

generating and storing on a tangible medium a first data structure having entries, each entry representing a network node and having a corresponding layer 2 network address and a corresponding layer 3 network address;

generating a second data structure having a plurality of data packet headers, by selecting selected entries from the first data structure as source and destination pairs and combining the layer 2 network addresses and layer 3 network addresses for the source and destination pairs with respective randomly-generated numbers representing layer 3 payload data to form the data packet headers; and evaluating a hash function by supplying the second data structure to a switch model configured for parsing at least a portion of the data packet headers according to the hash function, and monitoring results of the parsing by the hash function.

2. The method of claim 1, further comprising evaluating a plurality of selected hash functions by supplying the second data structure to switch models configured for parsing at least a portion of the data packet headers according to the respective hash functions.

3. The method of claim 1, wherein the step of generating and storing a first data structure includes storing in each entry a MAC address for the layer 2 network address, and an IP address having a prescribed network identifier and subnetwork identifier based on a prescribed network representation.

4. The method of claim 1, further comprising generating within the switch model a hash table, configured for storing a plurality of hash key signatures, by executing the hash function on the at least a portion of prescribed network addresses, the evaluating step including correlating hash key values, generated by the hash function based on the data packet headers, to the hash key signatures stored in the hash table.

5. The method of claim 4, wherein the step of generating a hash table includes generating a plurality of the hash tables within the switch model, each hash table configured for storing a corresponding plurality of hash key signatures according to a corresponding hash function, the evaluating step further including evaluating each of the hash functions based on the data packet headers.

6. The method of claim 4, wherein the evaluating step further includes determining a table efficiency of the hash table relative to the data packet headers.

7. The method of claim 4, wherein the evaluating step further includes determining a memory utilization of the hash table relative to the data packet headers.

8. A computer-based system comprising:
a controller for generating and storing on a tangible medium a first data structure having entries, each entry representing a network node and having a corresponding layer 2 network address and a corresponding layer 3 network address, the controller configured for generating a second data structure having a plurality of data packet headers, by selecting selected entries from the first data structure as source and destination pairs, and combining the layer 2 network addresses and layer 3 network addresses for the selected source and destination pairs with respective randomly-generated numbers representing layer 3 payload data to form the data packet headers;
a switch model configured for parsing at least a portion of the data packet headers according to at least one hash function; and
an evaluation module configured for evaluating the at least one hash function by supplying the second data structure to the switch model and monitoring results of the parsing by the hash function.

9. The system of claim 8, wherein the evaluation module is configured for evaluating a plurality of selected hash functions by supplying the second data structure to the switch model, configured for parsing at least a portion of the data packet headers according to the respective hash functions.

10. The system of claim 8, wherein the controller is configured for storing in each entry a MAC address for the layer 2 network address, and an IP address having a prescribed network identifier and subnetwork identifier based on a prescribed network representation.

11. The system of claim 8, wherein the switch model includes a hash generator configured for generating a hash table, configured for storing a plurality of hash key signatures, by executing the hash function on the at least a portion of prescribed network addresses, the evaluation module configured for correlating hash key values, generated by the hash function based on the data packet headers, to the hash key signatures stored in the hash table.

12. The system of claim 11, wherein the controller includes a random number generator configured for generating a payload for the data packet headers.

13. The system of claim 11, wherein the evaluation module is configured for determining a table efficiency of the hash table relative to the data packet headers.

14. The system of claim 11, wherein the evaluation module is configured for determining a memory utilization of the hash table relative to the data packet headers.

15. A computer readable medium having stored thereon sequences of instructions for evaluating a hash function, the sequences of instructions including instructions for performing the steps of:
generating and storing on a tangible medium a first data structure having entries, each entry representing a network node and having a corresponding layer 2 network address and a corresponding layer 3 network address;
generating a second data structure having a plurality of data packet headers, by selecting selected entries from the first data structure as source and destination pairs, and combining the layer 2 network addresses and layer 3 network addresses for the source and destination pairs with respective randomly-generated numbers representing layer 3 payload data to form the data packet headers; and
evaluating a hash function by supplying the second data structure to a switch model configured for parsing at least a portion of the data packet headers according to the hash function, and monitoring results of the parsing by the hash function.

16. The medium of claim 15, further comprising instructions for performing the step of evaluating a plurality of selected hash functions by supplying the second data structure to switch models configured for parsing at least a portion of the data packet headers according to the respective hash functions.

17. The medium of claim 15, wherein the step of generating and storing a first data structure includes storing in each entry a MAC address for the layer 2 network address, and an IP address having a prescribed network identifier and subnetwork identifier based on a prescribed network representation.

18. The medium of claim 15, further comprising instructions for performing the step of generating within the switch model a hash table, configured for storing a plurality of hash key signatures, by executing the hash function on the at least a portion of prescribed network addresses, the evaluating step including correlating hash key values, generated by the hash function based on the data packet headers, to the hash key signatures stored in the hash table.

19. The medium of claim 18, wherein the step of generating a hash table includes generating a plurality of the hash tables within the switch model, each hash table configured for storing a corresponding plurality of hash key signatures according to a corresponding hash function, the evaluating step further including evaluating each of the hash functions based on the data packet headers.

20. The medium of claim 18, wherein the evaluating step further includes determining a table efficiency of the hash table relative to the data packet headers.

21. The medium of claim 18, wherein the evaluating step further includes determining a memory utilization of the hash table relative to the data packet headers.

22. A system comprising:
a controller configured for generating and storing on a tangible medium a first data structure having entries, each entry representing a network node and having a corresponding layer 2 network address and a corresponding layer 3 network address, the controller configured for generating a second data structure having a plurality of data packet headers, by selecting selected entries from the first data structure as source and destination pairs, and combining the layer 2 network addresses and layer 3 network addresses for the selected source and destination pairs with respective randomly-generated numbers representing layer 3 payload data to form the data packet headers;
a hash function portion configured for parsing at least a portion of the data packet headers according to at least one hash function; and an evaluation module configured for evaluating the at least one hash function by supplying the second data structure to the hash function portion and monitoring results of the parsing by the hash function.

23. The system of claim 22, wherein the evaluation module is configured for evaluating a plurality of selected hash functions by supplying the second data structure to the hash function portion, configured for parsing at least a portion of the data packet headers according to the respective hash functions.

24. The system of claim 22, wherein the controller is configured for storing in each entry a MAC address for the layer 2 network address, and an IP address having a prescribed network identifier and subnetwork identifier based on a prescribed network representation.

25. The system of claim 22, wherein the hash function portion includes a hash generator configured for generating a hash table, configured for storing a plurality of hash key signatures, by executing the hash function on the at least a portion of prescribed network addresses, the evaluation module configured for correlating hash key values, generated by the hash function based on the data packet headers, to the hash key signatures stored in the hash table.

26. The system of claim 25, wherein the controller includes a random number generator configured for generating a payload for the data packet headers.

27. The system of claim 25, wherein the evaluation module is configured for determining a table efficiency of the hash table relative to the data packet headers.

28. The system of claim 25, wherein the evaluation module is configured for determining a memory utilization of the hash table relative to the data packet headers.

* * * * *